US008447280B2

(12) United States Patent
Cai et al.

(10) Patent No.: US 8,447,280 B2
(45) Date of Patent: May 21, 2013

(54) INTERFACE BETWEEN 3GPP NETWORKS AND 3GPP2 NETWORKS FOR WAP TEXT MESSAGING

(75) Inventors: Yigang Cai, Naperville, IL (US); Gopa Ganguly, New Albany, OH (US); Sanjeev Singh, New Albany, OH (US); Shaumir Shah, Aurora, IL (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/184,809

(22) Filed: Jul. 18, 2011

(65) Prior Publication Data

US 2013/0023253 A1 Jan. 24, 2013

(51) Int. Cl.
*H04M 3/42* (2006.01)
*H04W 68/00* (2009.01)

(52) U.S. Cl.
USPC .................. 455/414.1; 455/458; 455/419

(58) Field of Classification Search .................. 455/458, 455/466, 414.1, 435.1, 420, 566; 370/331, 370/356, 328, 419; 705/26.1
See application file for complete search history.

(56) References Cited

U.S. PATENT DOCUMENTS

| 2005/0176445 | A1* | 8/2005 | Qu et al. ................. 455/458 |
| 2006/0029096 | A1* | 2/2006 | Babbar et al. ............ 370/466 |
| 2007/0143779 | A1* | 6/2007 | Kaarela et al. ........... 725/25 |
| 2008/0207235 | A1* | 8/2008 | Choi ..................... 455/466 |
| 2011/0014933 | A1 | 1/2011 | Karmarkar |

FOREIGN PATENT DOCUMENTS

| WO | WO03090486 | 10/2003 |
| WO | WO2004006595 | 1/2004 |

OTHER PUBLICATIONS

"Short Message Service (SMS) for Wideband Spread Spectrum Systems Release A" 3GPP2 C.S0015-A Version 1.0, Jan. 11, 2002.
Short Message Peer to Peer, Protocol Specification v3.4, Oct. 12, 1999 Issue 1.2, (C) 1999 SMPP Developers Forum.
Wireless Application Protocol Wireless Control Message Protocol Specification, version Aug. 4, 1999, WAP WCMP.
WDP and WCMP Wireless Data Gateway Adaptation, Version Jul. 13, 2001, Wireless Application Protocol WAP-159-WDPWCMPAdapt-20010713-a, Ó2001, Wireless Application Protocol Forum, Ltd. All Rights Reserved. Terms and conditions of use are available from the WAP ForumÓWeb site (http://www.wapforum.org/what/copyright.htm ).
Wireless Datagram Protocol Version Jun. 14, 2001, Wireless Application Protocol WAP-259-WDP-20010614-a, Ó2001, Wireless Application Protocol Forum, Ltd. All Rights Reserved. Terms and conditions of use are available from the WAP ForumÓWeb site (http://www.wapforum.org/what/copyright.htm ).
3rd Generation Partnership Project; Technical Specification Group Core Network and Terminals; Technical realization of the Short Message Service (SMS) (Release 8); 3GPP TS 23.040 V8.2.0 (Jun. 2008).

* cited by examiner

Primary Examiner — Kiet Doan
(74) Attorney, Agent, or Firm — Duft Bornsen & Fettig LLP

(57) ABSTRACT

Systems and methods are disclosed for interworking WAP text messages between 3GPP and 3GPP2 networks. One embodiment comprises a system that receives a WAP text message from a sending entity that supports 3GPP standards, where the WAP text message is in a 3GPP format. The system determines that a receiving entity for the WAP text message supports 3GPP2 standards, and converts the WAP text message from the 3GPP format to a 3GPP2 format. The system then transmits the WAP text message in the 3GPP2 format to the receiving entity.

16 Claims, 4 Drawing Sheets

INTERFACE BETWEEN 3GPP NETWORKS AND 3GPP2 NETWORKS FOR WAP TEXT MESSAGING

FIELD OF THE INVENTION

The invention is related to the field of communications and, in particular, to interfacing 3GPP networks and 3GPP2 networks for text messaging.

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Wireless Application Protocol (WAP) is a suite of protocols that may be used in conjunction with text messaging protocols (e.g., SMS) to provide interactive sessions in mobile devices. Using WAP over SMS, for example, a user may send an SMS message that includes a Universal Resource Locator (URL). When the SMS message is received by the recipient, the recipient's device displays a URL link that the recipient may select to view the corresponding website.

The 3$^{rd}$ Generation Partnership Project (3GPP) is an organization that defines standards for telecommunications based on Global System for Mobile Communications (GSM) specifications. The 3$^{rd}$ Generation Partnership Project 2 (3GPP2) is another organization that defines standards for telecommunications based on CDMA2000 specifications. The 3GPP and 3GPP2 both define standards for text messaging, including text messaging using WAP. The 3GPP standards are different than the 3GPP2 standards, which makes WAP text messaging between 3GPP and 3GPP2 networks difficult if not impossible.

SUMMARY

Embodiments described herein interwork WAP text messages between a 3GPP network and a 3GPP2 network. A system described herein is able to translate WAP text messages from a 3GPP format to a 3GPP2 format, and vice-versa. This allows service providers to deliver WAP text messaging seamlessly across different technology networks, such as a Global System for Mobile Communications (GSM) network, a CDMA2000 network, a Long Term Evolution (LTE) network, an IP Multimedia Subsystem (IMS) network, etc.

One embodiment comprises a system that handles a WAP text message. The system includes an interface operable to receive a WAP text message from a sending entity that supports 3GPP standards, where the WAP text message is in a 3GPP format. The system further includes a controller operable to determine that a receiving entity for the WAP text message supports 3GPP2 standards, and to convert the WAP text message from the 3GPP format to a 3GPP2 format. The interface is further operable to transmit the WAP text message in the 3GPP2 format to the receiving entity.

In another embodiment, the interface is operable to receive a WAP text message from a sending entity that supports 3GPP2 standards, where the WAP text message is in a 3GPP2 format. The controller is further operable to determine that a receiving entity for the WAP text message supports 3GPP standards, and to convert the WAP text message from the 3GPP2 format to a 3GPP format. The interface is further operable to transmit the WAP text message in the 3GPP format to the receiving entity.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
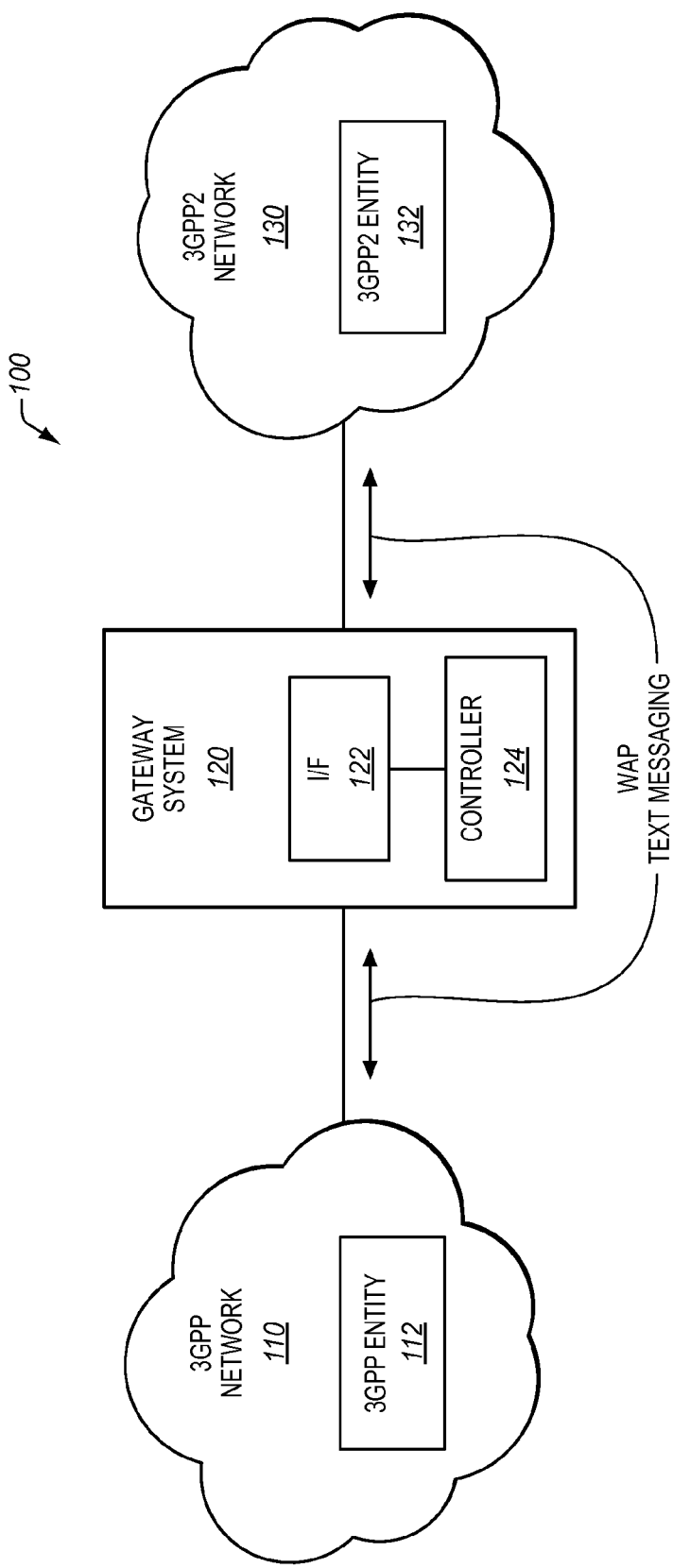
FIG. 1 illustrates a communication system in an exemplary embodiment.

FIG. 1 illustrates a communication system 100 in an exemplary embodiment. Communication system 100 includes a 3GPP network 110, a gateway system 120, and a 3GPP2 network 130. 3GPP network 110 comprises any network that communicates based on 3GPP standards. For example, 3GPP network 110 may comprise a GSM network, a Universal Mobile Telecommunications System (UMTS) network, an LTE network, an IMS network, etc. 3GPP network 110 includes 3GPP entity 112. 3GPP entity 112 comprises any server, node, device, etc., that communicates based on 3GPP standards. For example, 3GPP entity 112 may comprise a mobile device or an SMS Center (SMSC) in a GSM network or a UMTS network.

3GPP2 network 130 comprises any network that communicates based on 3GPP2 standards. For example, 3GPP2 network 130 may comprise a CDMA2000 network or an IMS network. 3GPP2 network 130 includes a 3GPP2 entity 132. 3GPP2 entity 132 comprises any server, node, device, etc., that communicates based on 3GPP2 standards. For example, 3GPP2 entity 132 may comprise a mobile device or an SMSC in a CDMA2000 network.

3GPP network 110 and 3GPP2 network 130 offer text messaging to their subscribers (not shown). In the embodiments described below, WAP messaging is used in conjunction with text messaging. 3GPP network 110 and 3GPP2 network 130 provide WAP text messaging in 3GPP format and 3GPP2 format, respectively. Because the 3GPP format for WAP text messaging and the 3GPP2 format for WAP text messaging are different, gateway system 120 is implemented between 3GPP network 110 and 3GPP2 network 130. Gateway system 120 comprises any system or server operable to interwork WAP text messages between a 3GPP format and a 3GPP2 format, and vice-versa. Gateway system 120 may be a stand-alone device as illustrated in FIG. 1. Alternatively, gateway system 120 may be implemented in a text messaging element in either network, such as in an SMSC, an IP-SM-GW, an SM-IC-GW, an LTE-SM-GW, etc.

Assume for one embodiment that 3GPP entity 112 sends a WAP text message that is intended for 3GPP2 entity 132. The WAP text message is encapsulated in a signaling message, such as a MAP ForwardSM or a SIP MESSAGE (RP-DATA). The WAP text message may be Mobile Originated (MO), Mobile Terminated (MT), Application Originated (AO), or Application Terminated (AT). Before the WAP text message can be sent to 3GPP2 entity 132, the WAP text message is sent to gateway system 120 for conversion to the proper format. The operation of gateway system 120 is described further in FIG. 2.

Figure 2:
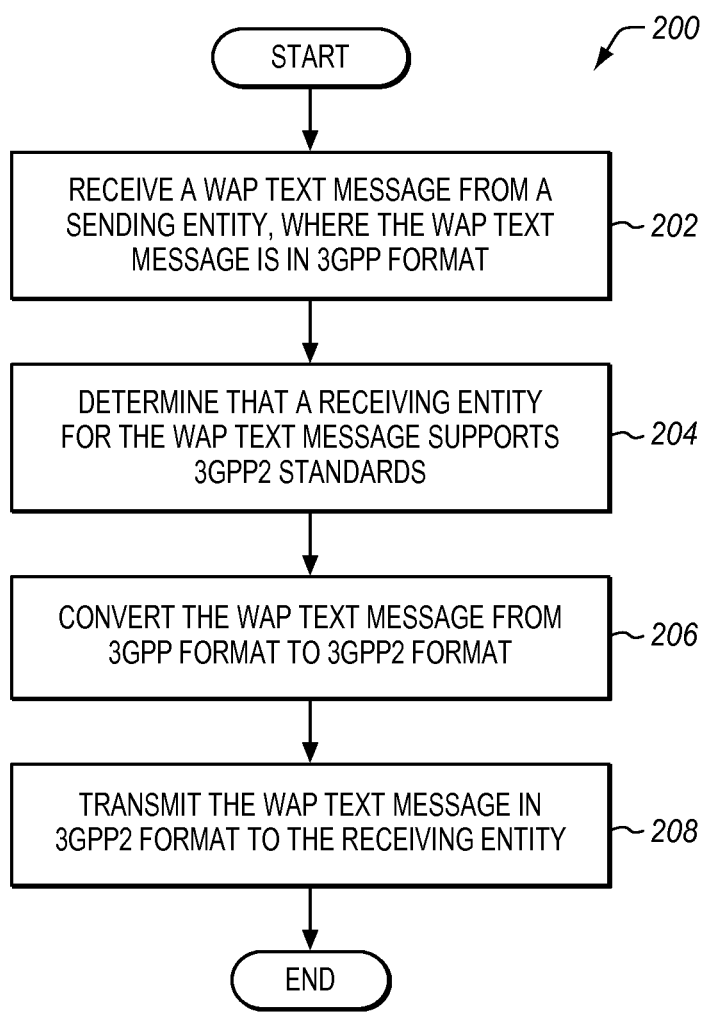
FIG. 2 is a flow chart illustrating a method of converting a WAP text message in an exemplary embodiment.

FIG. 2 is a flow chart illustrating a method 200 of converting a WAP text message in an exemplary embodiment. The steps of method 200 will be described with reference to gateway system 120 in FIG. 1, but those skilled in the art will appreciate that method 200 may be performed in other networks and systems. The steps of the flow charts described herein are not all inclusive and may include other steps not shown. The steps may also be performed in an alternative order.

In step 202, interface 122 receives the WAP text message from 3GPP entity 112 (which is the sending entity). The WAP text message is in 3GPP format. In step 204, controller 124 determines that 3GPP2 entity 132 (which is the receiving entity) supports 3GPP2 standards instead of 3GPP standards. For example, gateway system 120 may maintain its own database for the mode type used by the receiving entity. If the receiving entity is a handset, then controller 124 may access the local database to determine which standards the handset supports (including single or dual mode types). Controller 124 may also query a subscriber database, such as a Home Subscriber Server (HSS) or a Home Location Register (HLR) to check the registration status of the handset to determine which network the handset is in and which mode the handset is currently operating in. By determining the standard used by the handset, controller 124 is able to determine whether to convert the WAP text message from one standard to another standard.

Controller 124 then converts the WAP text message from 3GPP format to 3GPP2 format in step 206. After conversion, interface 122 transmits the WAP text message to 3GPP2 entity 132 in step 208. Because the WAP text message is converted to the appropriate format, 3GPP2 entity 132 is able to handle the WAP text message. For instance, if 3GPP2 entity 132 is a message center, such as an SMSC, then it is able to handle delivery of the WAP text message. If 3GPP2 entity 132 is a mobile device, then it is able to process the WAP text message for display to an end user.

To convert the WAP text message from 3GPP format to 3GPP2 format (step 206), controller 124 parses the WAP text message in 3GPP format to identify parameters for the WAP text message. For example, if the 3GPP WAP text message is a MAP message, then controller 124 identifies User Data Header (UDH) parameters of the Short Message-Transfer Layer (SM-TL). Controller 124 then maps the UDH parameters to User Data parameters of the Teleservice layer and/or Transport layer (in 3GPP2 format).

Assume for another embodiment that 3GPP2 entity 132 sends a WAP text message that is intended for 3GPP entity 112. Before the WAP text message can be sent to 3GPP entity 112, the WAP text message is sent to gateway system 120 for conversion to the proper format. The operation of gateway system 120 is described further in FIG. 3.

Figure 3:
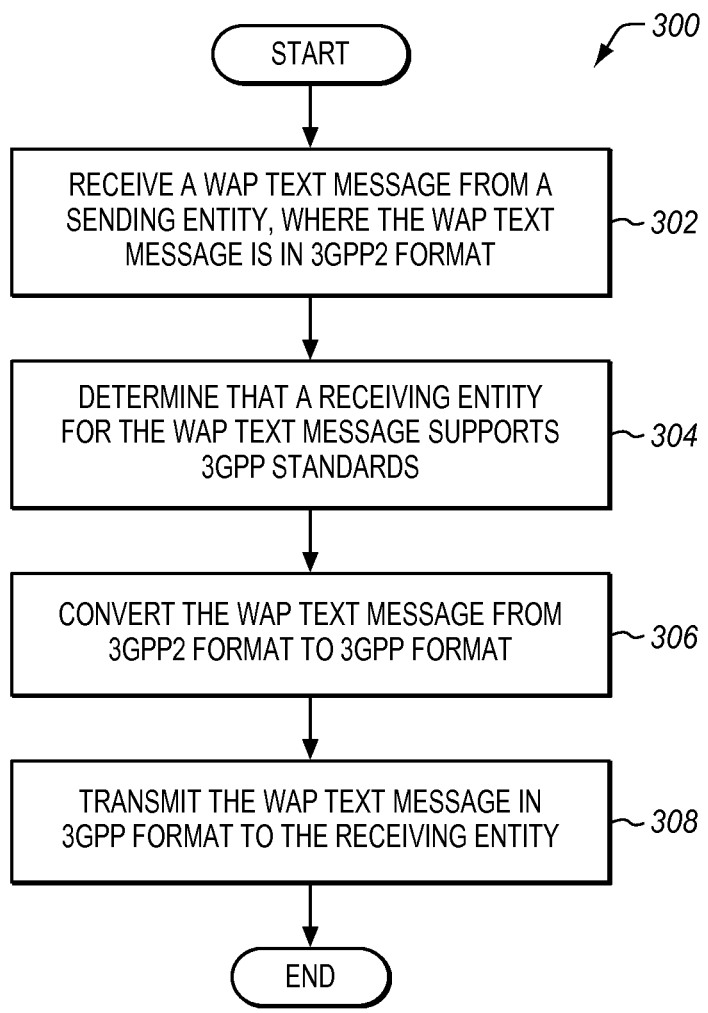
FIG. 3 is a flow chart illustrating another method of converting a WAP text message in an exemplary embodiment.

FIG. 3 is a flow chart illustrating another method 300 of converting a WAP text message in an exemplary embodiment. The steps of method 300 will be described with reference to gateway system 120 in FIG. 1, but those skilled in the art will appreciate that method 200 may be performed in other networks and systems.

In step 302, interface 122 receives the WAP text message from 3GPP2 entity 132 (which is the sending entity). The WAP text message is in 3GPP2 format. In step 304, controller 124 determines that 3GPP entity 112 (which is the receiving entity) supports 3GPP standards instead of 3GPP2 standards. Therefore, controller 124 converts the WAP text message from 3GPP2 format to 3GPP format in step 306. After conversion, interface 122 transmits the WAP text message to 3GPP entity 112 in step 308. Because the WAP text message was converted to the appropriate format, 3GPP entity 112 is able to handle the WAP text message.

To convert the WAP text message from 3GPP2 format to 3GPP format (step 306), controller 124 parses the WAP text message in 3GPP2 format to identify Teleservice layer and/or Transport layer parameters. Controller 124 then maps the Teleservice layer and Transport layer parameters to SM-TL parameters in the 3GPP format.

Figure 4:
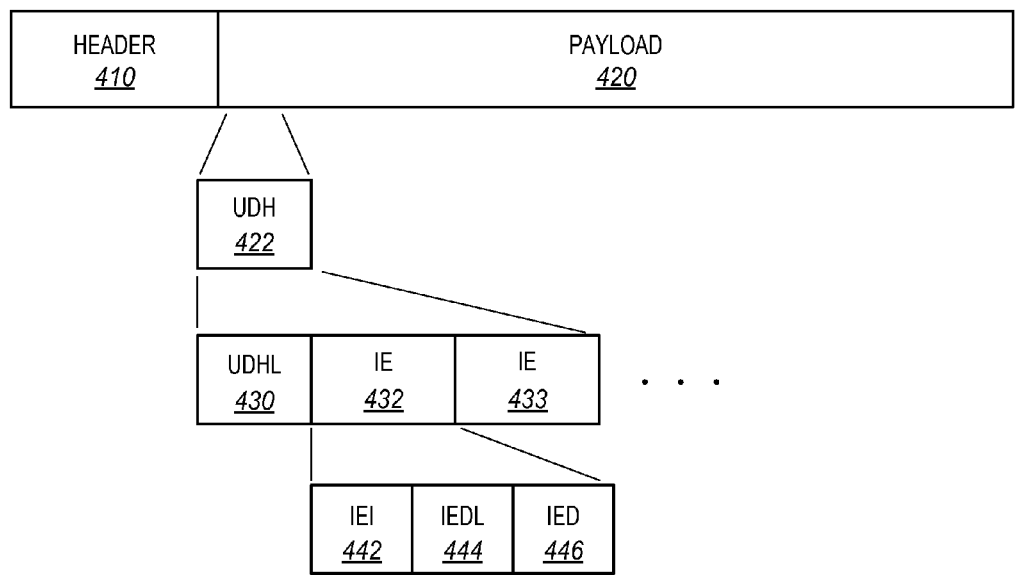
FIG. 4 illustrates a 3GPP text message in an exemplary embodiment.

Format conversion is described in more detail below. Text messages are encoded as a header and a payload in a Protocol Description Unit (PDU). FIG. 4 illustrates a 3GPP text message 400 in an exemplary embodiment. Text message 400 includes header 410 and payload 420. Header 410 includes metadata for transporting the text message in the Short Message Transport Layer (SM-TL), such as an originating address for the text message, a destination address for the text message, etc. Payload 420 includes the actual content for the text message.

When WAP is implemented with 3GPP text messaging, a User Data Header (UDH) 422 is inserted in payload 420 of the text message. Therefore, payload 420 comprises UDH 422 followed by the content of the text message. UDH 422 includes the data for the WAP function being used in the text message. For example, if the WAP function is a "PUSH", then the data in the UDH 422 indicates destination and source ports for the PUSH operation.

UDH 422 includes a User Data Header Length (UDHL) parameter 430 and one or more Information Elements (IE) 432-433. Each Information Element (IE) 432 includes the following sub-parameters (typically in octets): Information Element Identifier (IEI) 442, Information Element Data Length (IEDL) 444, and Information Element Data (IED) 446. IEI 442 indicates the type of data included in an IED 446. For example, if IEI 442 is set to "05", then the IED 446 includes source port information and destination port information for WAP applications. If IEI 442 is set to "00", then IED 446 includes information for concatenation of a text message (i.e., a long text message (over 160 characters) is segmented and sent as multiple messages).

The following illustrates an example of an IE 432:
05 04 0B 84 23 FO

In this IE 432, the "05" octet is IEI 442, which indicates that port addressing information is included in the IED 446.

The "04" octet is IEDL 444, which indicates that the data length is four octets. The "0B 84" octets and "23 F0" octets are IED 446. The "0B 84" octets indicate the destination port, which is commonly used for a WAP PUSH operation. The "23 F0" octets indicate the source port.

Figure 5:
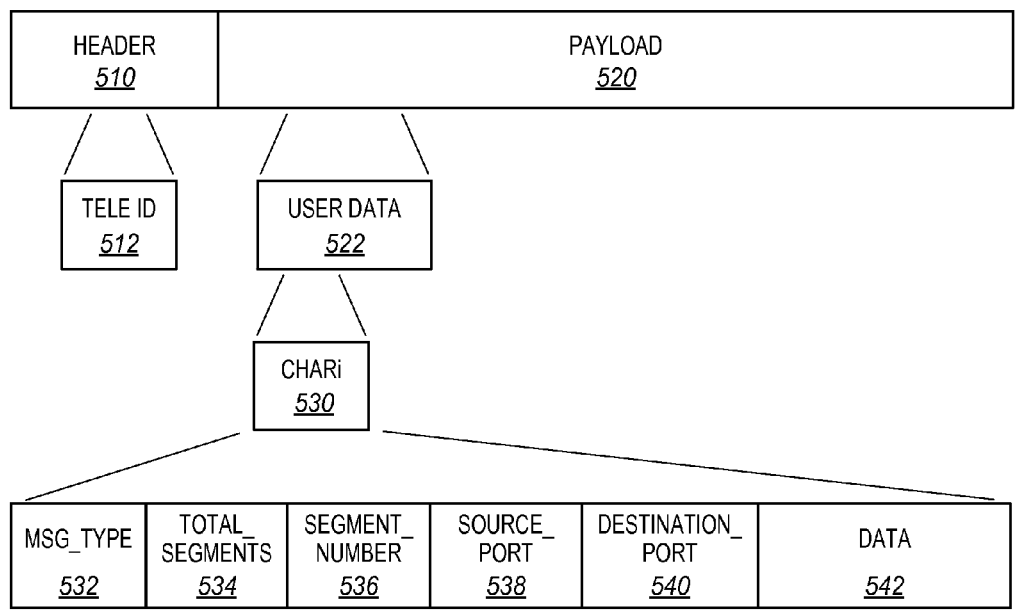
FIG. 5 illustrates a 3GPP2 text message in an exemplary embodiment.

FIG. 5 illustrates a 3GPP2 text message 500 in an exemplary embodiment. Text message 500 includes a header 510 and a payload 520. As above, header 510 includes metadata for transporting the text message. In this embodiment, header 510 includes a Teleservice ID parameter 512 that is part of the Transport Layer in the 3GPP2 SMS protocol stack. When the text message includes a WAP operation, then the Teleservice ID is set to "4100". Payload 520 includes a User Data parameter 522 that is part of the Teleservice Layer in the 3GPP2 SMS protocol stack. When WAP is implemented with 3GPP2 text messaging, the WAP information is inserted in User Data parameter 522. User Data parameter 522 includes a CHARi field structure 530, which includes the following fields: message type (MSG_TYPE) 532, total number of segments (TOTAL_SEGMENTS) 534, segment number (SEGMENT_NUMBER) 536, source port (SOURCE_PORT) 538, destination port (DESTINATION_PORT) 540, and the content of the text message (DATA) 542.

As is evident in comparing FIG. 4 and FIG. 5, the text message formats for 3GPP WAP and for 3GPP2 WAP are different. Therefore, to convert between 3GPP format and 3GPP2 format, a mapping is described herein between the parameters of the 3GPP UDH and the fields of the 3GPP2 User Data (Teleservice Layer). The term "parameter" and "field" are used interchangeably herein.

Most WAP text messages are sent using WAP Datagram Protocol (WDP). Table 1 illustrates an exemplary mapping between 3GPP and 3GPP2 for WDP messages.

TABLE 1

| CHARi Field Structure | Length (bits) | GSM Field |
| --- | --- | --- |
| MSG_TYPE (='00000000') | 8 | Test equal to '00000000' for WDP |
| TOTAL_SEGMENTS | 8 | Part of IEI 0, in UDH |
| SEGMENT_NUMBER | 8 | Part of IEI 0, in UDH |
| SOURCE_PORT | 16 | Part of IEI 5, in UDH |
| DESTINATION_PORT | 16 | Part of IEI 5, in UDH |
| DATA | (NUM_FIELDS − 7) * 8 | TP-User-Data content, after the UDH |

Based on Table 1, TOTAL_SEGMENTS field 534 of the 3GPP2 User Data parameter is mapped to an Information Element of the 3GPP UDH having an IEI set to "00" (e.g., concatenated text message). More particularly, the TOTAL_SEGMENTS field 534 is mapped to the IED parameter in this IE that indicates the number of segments in a concatenated message. SEGMENT_NUMBER field 536 of the 3GPP2 User Data parameter is also mapped to the Information Element having an IEI set to "00". More particularly, the SEGMENT_NUMBER field 536 is mapped to the IED parameter in this IE that indicates the segment number of a concatenated message. The SOURCE_PORT field 538 of the 3GPP2 User Data parameter is mapped to the Information Element having an IEI set to "05". More particularly, the SOURCE_PORT field 538 is mapped to the IED parameter in this IE that indicates the source port number. The DESTINATION_PORT field 540 of the 3GPP2 User Data parameter is mapped to the Information Element having an IEI set to "05". More particularly, the DESTINATION_PORT field 540 is mapped to the IED parameter in this IE that indicates the destination port number. The DATA field 542 of the 3GPP2 User Data parameter is mapped to the TP-User-Data parameter that follows the UDH.

Wireless Control Message Protocol (WCMP) provides an error reporting mechanism for the WDP. It can also be used for diagnostics and informational purposes. Table 2 illustrates an exemplary mapping between 3GPP and 3GPP2 for WDP messages:

TABLE 2

| CHARi Field Structure | Length (bits) | GSM Field |
| --- | --- | --- |
| MSG_TYPE (='00000001') | 8 | Test equal to '00000001' for WCMP |
| WCMP_MESSAGE | (NUM_FIELDS − 1) * 8 | Add IEI 09 to the UDH, and include the WCMP message in IED |

Based on Table 2, the WCMP_MESSAGE field of the 3GPP2 User Data parameter is mapped to an Information Element of the 3GPP UDH having an IEI set to "09". More particularly, the WCMP_MESSAGE field is mapped to the IED parameter in this IE.

The 3GPP and 3GPP2 formats have different user data lengths. During conversion from 3GPP2 format to 3GPP format, the unmatched length limitation could cause problems. One option is to trim or drop characters in the 3GPP2 WAP text message to meet the size limitation of the 3GPP format. Another option is to segment the 3GPP2 WAP text message to handle the different user data lengths between the formats. For example, assume that controller 124 receives a 3GPP2 WAP text message. If the length of the 3GPP2 WAP text message exceeds the maximum SMS length (e.g., 140 octets) for the 3GPP format, then controller 124 segments the 3GPP2 WAP text message into multiple 3GPP WAP text messages. Controller 124 then sends the multiple segments to the receiving entity.

When a 3GPP2 WAP text message is segmented into multiple 3GPP WAP text messages, only the first segment carries the port numbers. However, 3GPP WAP requires the port number to be in each segment, because the different segments of the same WAP text message could go to different SMS gateways. One solution to this problem is to use the following IEIs for encoding of User Data Header (UDH) in the 3GPP WAP text message:

1. IEI "00" (8-bit reference number) or IEI "08" (16-bit reference number) depending on the message reference value, for concatenation information if the WAP text message is a multi-segment message. For multi-segment WAP text message, these IEI values are encoded in each segment of the WAP text message.

2. IEI "05" (16-bit address) for SOURCE_PORT and DESTINATION_PORT for the incoming SMPP WAP text message. For a single segment message or for the first segment of a multi-segment WAP text message, controller 124 uses the port numbers from the incoming SMPP message from the following sources: TLVs 'source_port' and 'destination_port' if present in the message, or WAP WDP message payload (first 4 octets). For each of the subsequent segments of a multi-segment WAP text message, controller 124 uses the port numbers from the TLVs ('source_port' and 'destination_port') if the TLVs are present in the SMPP message for that segment. If these TLVs are not present in a specific segment, then controller 124 does not encode the port numbers in the 3GPP UDH for that segment.

If the SMPP message is multi-segment message, then controller 124 uses the TP-MMS parameter to indicate more messages to send for efficient delivery of the segmented WAP text message. The TP-DCS parameter may be set to 8-bit data since the data_coding in the incoming WAP text message is octet unspecified.

When converting from 3GPP format to 3GPP2 format, controller 124 may convert multiple segments of a 3GPP WAP text message into a single segment in 3GPP2 format. Thus, controller 124 receives a segment of the WAP text message in 3GPP format. Controller 124 determines that the WAP text message is one of multiple segments for this message. Therefore, controller 124 waits until all segments are received for the WAP text message. Controller 124 then aggregates the payloads of the segments, and converts the WAP text message from 3GPP format to 3GPP2 format. After aggregation and conversion, controller 124 sends the WAP text message in 3GPP2 format to the receiving entity.

The embodiments described above allow service providers to deliver WAP text messages seamlessly across different technology networks (e.g., CDMA2000, GSM, UMTS, IMS, LTE, etc.).

The following examples illustrate conversion between 3GPP format and 3GPP2 format. Assume in one example that 3GPP entity 112 in FIG. 1 is a mobile device that originates a WAP SMS message in 3GPP format. The WAP SMS message may be encapsulated in either a MAP mo-ForwardSM (SMS-SUBMIT), or a SIP MESSAGE with RP-DATA for SMS-SUBMIT. Because this is a WAP message, the TP-User-Data parameter of the WAP SMS message includes a UDH. The UDH includes an Information Element with an IEI set to "05" for source/destination ports. The UDH also includes an Information Element with an IEI set to "09" for WCMP. Gateway system 120 detects that 3GPP2 entity 132 only supports 3GPP2 format. Thus, gateway system 120 converts the 3GPP WAP MO SMS message into a 3GPP2 WAP MO SMS message by mapping the UDH parameters to 3GPP2 User Data parameters. For instance, gateway system 120 maps the IED for an Information Element (IEI="05") to the SOURCE_PORT parameter and DESTINATION_PORT parameter of the 3GPP2 User Data (see Table 1). Gateway system 120 then forwards the WAP MO SMS message to 3GPP2 entity 132 in 3GPP2 format.

In another example, assume that 3GPP2 entity 132 is a mobile device that originates a WAP WDP or WAP WCMP SMS message with the Teleservice ID=4100. The 3GPP2 WAP SMS message is received by gateway system 120. In this example, gateway system 120 may be implemented in an SMS-IC-GW, an IP-SM-GW, an LTE-SMS-GW, etc. The receiving entity 112 may comprise an SMSC or SMS GW. Gateway system 120 detects that receiving entity 112 only supports 3GPP format. Thus, gateway system 120 converts the 3GPP2 WAP SMS message into either a 3GPP MAP mo-ForwardSM (SMS-SUBMIT) or a SIP MESSAGE encapsulated RP-DATA for SMS-SUBMIT. In either case, gateway system 120 maps 3GPP2 User Data parameters with TP-User Data in the MAP mo-ForwardSM (SMS-SUBMIT) or a SIP MESSAGE. For instance, gateway system 120 maps the SOURCE_PORT parameter and DESTINATION_PORT parameter to an Information Element with an IEI set to "05" for source/destination ports (see Table 1). Gateway system 120 then forwards the WAP MO SMS message to 3GPP entity 112 in 3GPP format.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
an interface operable to receive a Wireless Application Protocol (WAP) text message from a sending entity that supports $3^{rd}$ Generation Partnership Project (3GPP) standards, wherein the WAP text message is in a 3GPP format; and
a controller operable to determine that a receiving entity for the WAP text message supports $3^{rd}$ Generation Partnership Project 2 (3GPP2) standards, and to convert the WAP text message from the 3GPP format to a 3GPP2 format;
the interface is further operable to transmit the WAP text message in the 3GPP2 format to the receiving entity;
wherein:
the controller is further operable to parse the WAP text message in 3GPP format to identify User Data Header (UDH) parameters, and to map the UDH parameters to User Data parameters of the 3GPP2 Teleservice Layer.

2. The system of claim 1 wherein:
the controller is further operable to map Information Element Data from an Information Element having an Information Element Identifier set to "05" to a source port parameter and a destination port parameter in the Teleservice Layer.

3. The system of claim 1 wherein:
the controller is further operable to map Information Element Data from an Information Element having an Information Element Identifier set to "00" to a number-of-segments parameter and a segment-number parameter in the Teleservice Layer.

4. The system of claim 1 wherein:
the controller is further operable to receive multiple segments for the WAP text message in 3GPP format, to aggregate the multiple segments into a single segment, and to convert the single segment of the WAP text message to the 3GPP2 format.

5. A method comprising:
receiving a Wireless Application Protocol (WAP) text message from a sending entity that supports $3^{rd}$ Generation Partnership Project (3GPP) standards, wherein the WAP text message is in a 3GPP format;
determining that a receiving entity for the WAP text message supports $3^{rd}$ Generation Partnership Project 2 (3GPP2) standards;
converting the WAP text message from the 3GPP format to a 3GPP2 format; and
transmitting the WAP text message in the 3GPP2 format to the receiving entity;
wherein converting the WAP text message from the 3GPP format to a 3GPP2 format comprises:
parsing the WAP text message in 3GPP format to identify User Data Header (UDH) parameters; and
mapping the UDH parameters to User Data parameters of the 3GPP2 Teleservice Layer.

6. The method of claim 5 wherein mapping the UDH parameters comprises:
mapping Information Element Data from an Information Element having an Information Element Identifier set to "05" to a source port parameter and a destination port parameter in the Teleservice Layer.

7. The method of claim 5 wherein mapping the UDH parameters comprises:
mapping Information Element Data from an Information Element having an Information Element Identifier set to "00" to a number-of-segments parameter and a segment-number parameter in the Teleservice Layer.

8. The method of claim 5 further comprising:
receiving multiple segments for the WAP text message in 3GPP format'
aggregating the multiple segments into a single segment; and
converting the single segment of the WAP text message to the 3GPP2 format.

9. A system comprising:
an interface operable to receive a Wireless Application Protocol (WAP) text message from a sending entity that supports $3^{rd}$ Generation Partnership Project 2 (3GPP2) standards, wherein the WAP text message is in a 3GPP2 format; and
a controller operable to determine that a receiving entity for the WAP text message supports $3^{rd}$ Generation Partnership Project (3GPP) standards, and to convert the WAP text message from the 3GPP2 format to a 3GPP format;
the interface is further operable to transmit the WAP text message in the 3GPP format to the receiving entity; wherein:
the controller is further operable to parse the WAP text message in 3GPP2 format to identify User Data parameters of the 3GPP2 Teleservice Layer, and to map the User Data parameters to User Data Header (UDH) parameters of the Mobile Application Part (MAP) Short Message Transport Layer (SM-TL).

10. The system of claim 9 wherein:
the controller is further operable to map a source port parameter and a destination port parameter in the Teleservice Layer to Information Element Data from an Information Element having an Information Element Identifier set to "05".

11. The system of claim 9 wherein:
the controller is further operable to map a number-of-segments parameter and a segment-number parameter in the Teleservice Layer to Information Element Data from an Information Element having an Information Element Identifier set to "00".

12. The system of claim 9 wherein:
the controller is further operable to determine that after conversion, a length of the WAP text message exceeds a length limit in the 3GPP format, and to segment the WAP text message into multiple segments in the 3GPP format.

13. A method comprising:
receiving a Wireless Application Protocol (WAP) text message from a sending entity that supports $3^{rd}$ Generation Partnership Project 2 (3GPP2) standards, wherein the WAP text message is in a 3GPP2 format;
determining that a receiving entity for the WAP text message supports $3^{rd}$ Generation Partnership Project (3GPP) standards;
converting the WAP text message from the 3GPP2 format to a 3GPP format; and
transmitting the WAP text message in the 3GPP format to the receiving entity;
wherein converting the WAP text message from the 3GPP2 format to a 3GPP format comprises:
parsing the WAP text message in 3GPP2 format to identify User Data parameters of the 3GPP2 Teleservice Layer; and
mapping the User Data parameters to User Data Header (UDH) parameters of the Mobile Application Part (MAP) Short Message Transport Layer (SM-TL).

14. The method of claim 13 wherein mapping the User Data parameters comprises:
mapping a source port parameter and a destination port parameter in the Teleservice Layer to Information Element Data from an Information Element having an Information Element Identifier set to "05".

15. The method of claim 13 wherein mapping the User Data parameters comprises:
mapping a number-of-segments parameter and a segment-number parameter in the Teleservice Layer to Information Element Data from an Information Element having an Information Element Identifier set to "00".

16. The method of claim 13 further comprising:
determining that after conversion, a length of the WAP text message exceeds a length limit in the 3GPP format; and
segmenting the WAP text message into multiple segments in the 3GPP format.

* * * * *